UNITED STATES PATENT OFFICE.

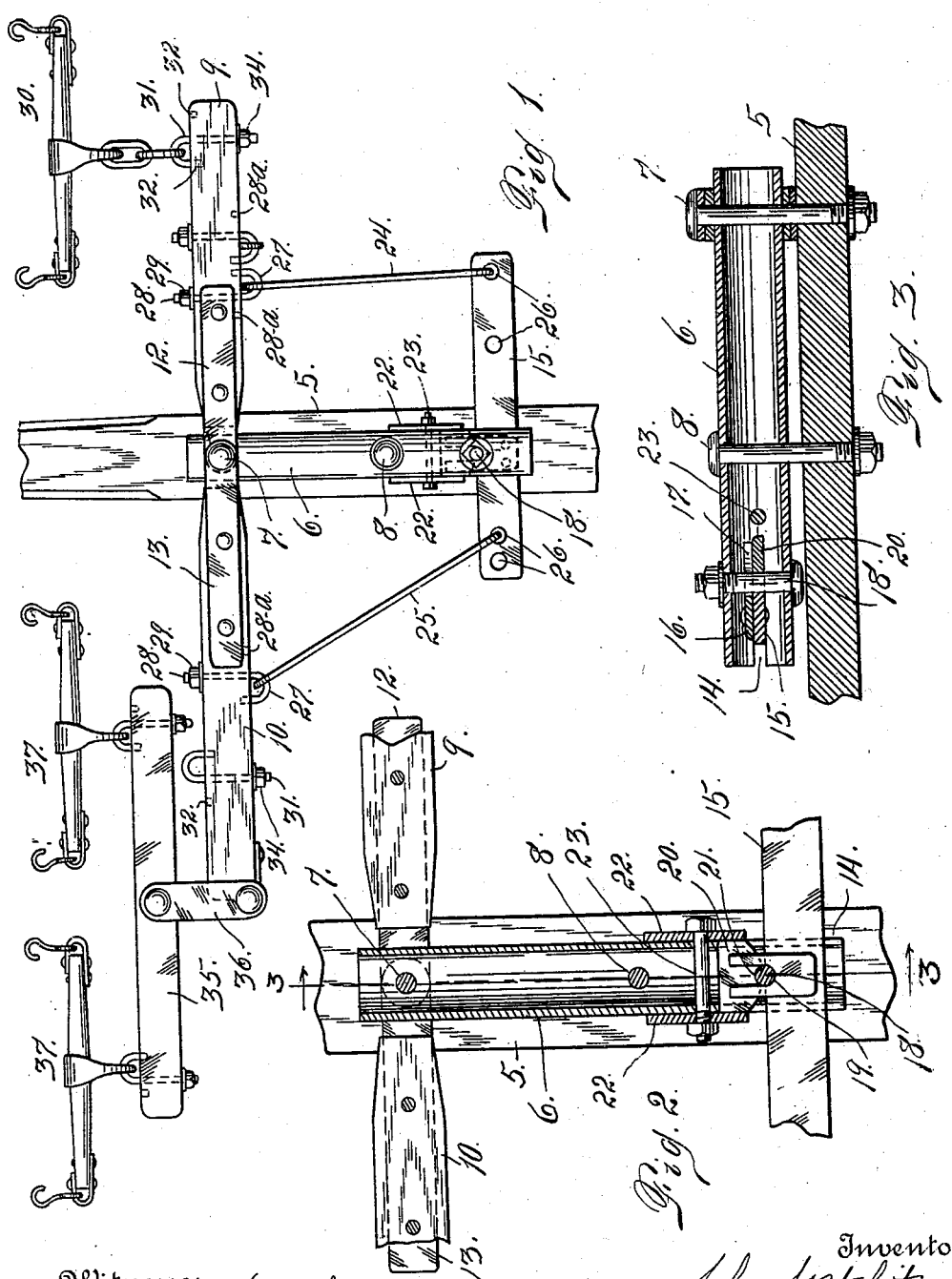

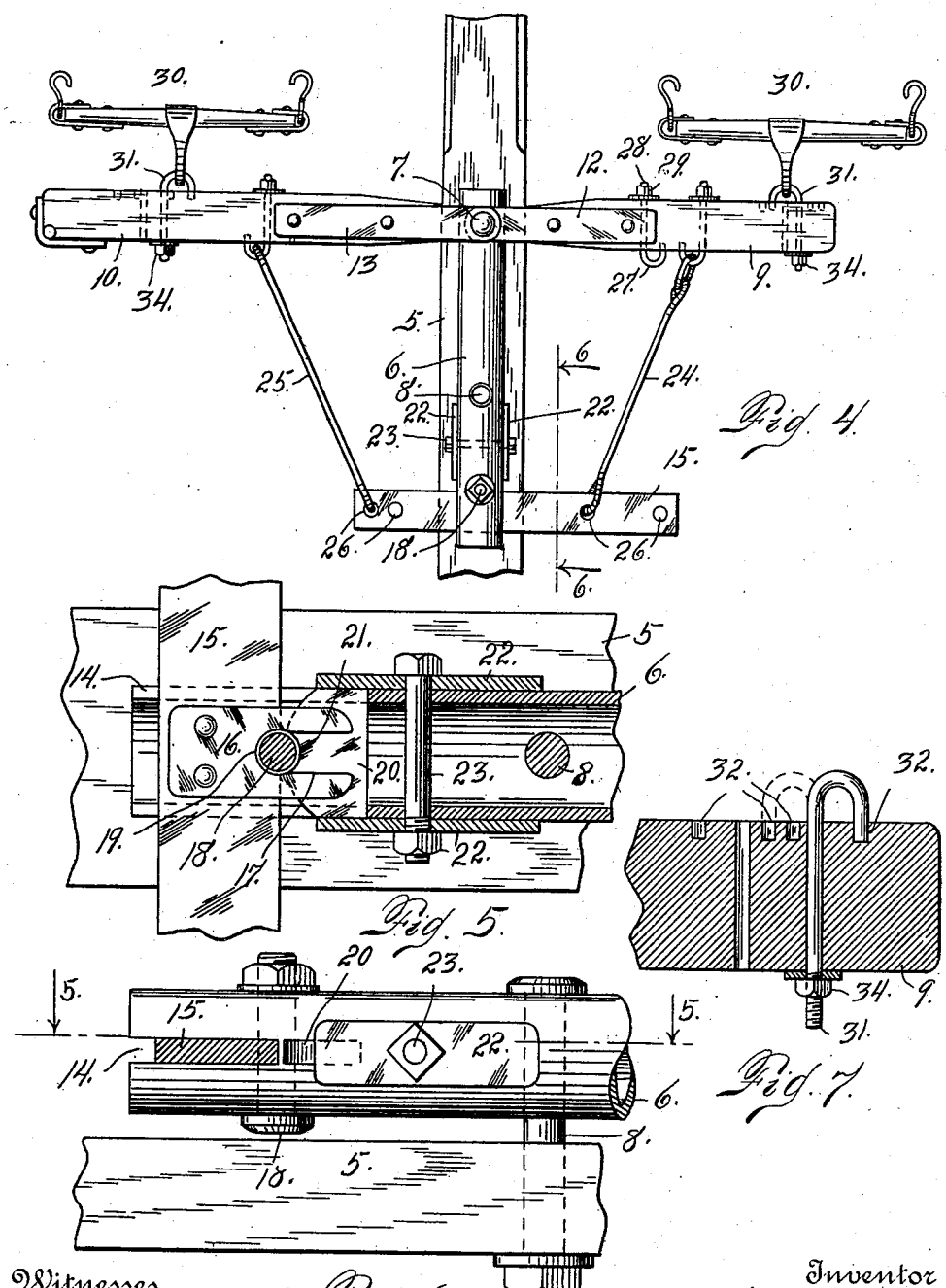

JOHN J. WHITE, OF DENVER, COLORADO.

DRAFT-EQUALIZER.

980,854.    Specification of Letters Patent.    Patented Jan. 3, 1911.

Application filed April 15, 1910. Serial No. 555,728.

*To all whom it may concern:*

Be it known that I, JOHN J. WHITE, a citizen of the United States, residing in the city and county of Denver and State of Colorado, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in draft equalizers, my object being to provide means whereby the draft may be easily and accurately regulated where two, three, four or more, horses are employed on machines having tongues.

In many kinds of work it becomes necessary, as in plowing with a sulky or vehicle plow, for one horse only to walk upon the furrow side of the tongue. Hence, when more than two horses are required for draft purposes, it becomes necessary for two or more horses to travel on the opposite side of the tongue. In this event it becomes necessary to so regulate the draft between the single horse on the one side and the horses on the other side, that the draft may be properly proportioned, and the object of my present invention, as heretofore indicated, is to accomplish this end in a simple, economical and efficient manner, all of which will be fully understood by reference to the accompanying drawing, in which is illustrated an embodiment thereof.

In this drawing: Figure 1 is a top plan view of my improved draft equalizing mechanism constructed for use with three horses, one of which travels on one side of the tongue and the other two on the opposite side. Fig. 2 is a fragmentary horizontal section taken through the hollow draft bar and its connections, the parts being shown on a larger scale. Fig. 3 is a vertical section of the same taken on the line 3—3, Fig. 2. Fig. 4 is a top plan view illustrating my improved construction adapted for use with two horses, one traveling on each side of the tongue. Fig. 5 is a horizontal section taken on the line 5—5, Fig. 6, the parts being shown on a larger scale than in Figs. 2 and 3. Fig. 6 is a side elevation looking in the direction of arrow 6, Fig. 4. Fig. 7 is a sectional detail view taken through one of the draft bars, illustrating a feature of adjustment, the parts being shown on a larger scale.

The same reference characters indicate the same parts in all the views.

Let the numeral 5 designate the tongue of the vehicle, upon which is mounted and made fast a hollow draft bar 6. As shown in the drawing, this draft bar is secured to the tongue by bolts 7 and 8. The bolt 7 is forwardly located and serves as a pivot for the inner extremities of two draft levers 9 and 10, whose extremities adjacent the draft bar are equipped with upper and lower metal plates or straps 12 and 13, whose inner extremities straddle the forward end of the draft bar and overlap each other, their overlapping portions both above and below the bar being apertured to receive the bolt 7. The bolt 8 serves only the one function, namely that of connecting the draft bar with the tongue.

The rear extremity of the draft bar is slotted as shown at 14 to receive a short evener 15 which enters the horizontal slot 14 of the draft bar edgewise. To the top of this evener is secured a plate 16 forwardly slotted as shown at 17 to receive a bolt 18 which passes through the hollow draft bar vertically and forms a bearing or fulcrum in front for the evener 15 which is provided with a semi-circular recess 19 to make room for the fulcrum bolt 18. The slotted portion of the plate 16 extends forward of the evener and by virtue of its slot maintains an operative connection between the evener and the bolt. This bolt is sustained or reinforced in front by a plate or web forming an abutment 20 preferably formed integral with the draft bar. This abutment 20 is rounded or curved forwardly from the semi-circular recess 21 which is engaged by the bolt 18, whereby the evener may turn upon the bolt with given limits. However, if the draft animal or animals on one side of the tongue shall get considerably in advance of those on the other side, whereby the evener will be inclined to a line extending diagonally to the direction of travel, its forward edge will turn on the curved portion of the abutment on one side. The movement or turning of the evener may be regulated at will. In order to provide for such regulation or adjustment, I have equipped the draft bar with two regulating plates 22, located on opposite sides of the said bar and connected therewith by a horizontally disposed bolt 23 which passes through openings formed in these plates and also through registering openings in the draft bar. The bolt holes in the plates 22 are located nearer one end of the plates than the other. Hence, by loosening this bolt and reversing the plates, their rear extremities may be brought nearer or farther away from the evener, thus regulating the turning movement of the evener upon its bearing bolt and abutment 20 before such movement will be arrested.

The evener is connected on each side of the tongue with the draft levers 9 and 10, by rods 24 and 25, respectively. The rear extremities of these rods are connected with openings 26 formed in the short evener, in such a manner as to give the lone horse a proper advantage. For instance, assuming that each horse of the two on one side is of the same strength as the single horse on the opposite side of the tongue, the portion of the short evener on the side of the single horse should be twice as long from the center of the fulcrum bolt 18 as the length of the evener projecting from the same point on the opposite side of the tongue. The forward extremities of these rods may be connected with the draft levers at suitable points, preferably about midway between the extremities of the said lever.

As illustrated in the drawing, the forward extremities of the draft rods 24 and 25 are connected with the hooked ends 27 of bolts 28 whose forward extremities are connected with the draft levers by nuts 29. In order to securely lock the hooked extremities of these bolts in the proper horizontal position, the draft levers are provided with shallow recesses 28$^a$, so arranged that the hooked ends of the said bolts may enter these recesses, thus locking them against turning. The draft levers, however, are provided with recesses 28$^a$ on either side of the axis of each bolt, so that by turning the bolt in either direction a recess 28$^a$ will be in line to receive its hooked extremity, when the tightening nut is properly screwed up. The swingle-tree 30 on one side the tongue is connected with a similar bolt 31 passing horizontally through the draft bar 9 and whose hooked extremity is arranged to enter recesses 32 formed on each side of the shank of the bolt and in proper position to receive the hooked end of the latter when the bolt is tightened by its fastening nut 34. There is also a similar bolt 31 connected with the draft bar 10 and suitably arranged on the opposite side of the tongue, when it may be desirable to use but two horses, one being connected with each draft lever. When, however, two horses are employed on one side of the tongue, a double-tree 35 is connected with the draft bar 10 by a clevis 36 and swingle trees 37 connected with the opposite extremities of the double tree.

In the form of construction shown in Fig. 4, where the arrangement is for two horses only, one on each side of the tongue, it will be observed that the construction is the same except that the draft rods are connected at their rear extremities with the short evener 15, at equal distances from the fulcrum bolt 18. In this event it is also preferable to connect the forward extremities of the draft rods 24 and 25 with their respective draft levers 9 and 10, at equal distances from the pivot bolt 7.

Having thus described my invention, what I claim is:

1. In a draft equalizer, the combination with a tongue, and draft levers independently pivoted thereon, of a short evener located in the rear of the draft levers, a draft bar mounted on the tongue and provided with a fulcrum pin which the said evener engages, the rear extremity of the draft bar being slotted, the draft bar having an abutment member, the rear extremity of the abutment member being curved beyond the fulcrum pin, the draft bar on opposite sides of the fulcrum pin having a plate to limit the turning movement of the short evener in either direction, and an operative connection between the short evener on opposite sides of the fulcrum and the respective draft levers, substantially as described.

2. In a draft equalizer, the combination with a tongue and draft levers independently pivoted thereon, of a hollow draft bar secured to the tongue and through which the fulcrum of the draft levers passes, the rear extremity of the hollow draft bar being slotted and provided with a fulcrum pin, the draft bar having a central abutment engaging the fulcrum pin in front, the rear edge of the abutment being curved beyond the pin, a short evener engaging the slot of the draft bar and recessed to engage the fulcrum pin, the opposite sides of the fulcrum bar being provided with adjustable means for regulating the turning movement of the short evener, and an operative connection between the evener on opposite sides of its fulcrum, and the respective draft levers, substantially as described.

3. In a draft equalizer, the combination with a tongue, of a hollow draft bar fixedly mounted thereon, a fulcrum bolt passing through the forward end of the draft bar and the tongue, draft levers having their inner extremities independently fulcrumed on the said bolt, the rear portion of the hollow draft bar being horizontally slotted and provided with a central abutment adjacent the slot, a fulcrum pin passing vertically through the draft bar and bearing against the abutment in front, a short evener entering the slot of the draft bar and engaging the fulcrum pin in the rear, the short evener being equipped with a plate extending forwardly from its front edge and slotted to receive the fulcrum pin, and an operative connection between the draft levers and the opposite ends of the short evener, substantially as described.

4. The combination with a suitable support, of draft levers having their inner extremities independently pivoted thereon, a fulcrum mounted on the support in the rear of the draft levers, a short evener engaging the said fulcrum, adjustable means mounted on the support in front of the short evener for limiting the turning movement of the latter in either direction, and an operative connection between the short evener and the draft levers, substantially as described.

5. The combination with a suitable support, of draft levers having their inner extremities fulcrumed to turn independently on said support, whiffletrees connected with the draft levers, a short evener located in the rear of the draft levers and fulcrumed on the said support, the latter having reversible plates mounted on the support forward of the short evener and serving to regulate the turning movement of the evener in either direction, and rods connecting the opposite extremities of the short evener with the respective draft levers, substantially as described.

6. A draft equalizer, comprising a suitable support, a hollow draft bar mounted thereon and having a forward fulcrum bolt passing through the said bar and the tongue, and a rear fulcrum pin passing through the said bar, draft levers having their inner extremities pivotally connected with the fulcrum bolt, a short evener entering a slot formed in the rear extremity of the draft bar and engaging the fulcrum pin, plates reversibly attached to the opposite sides of the draft bar, a fastening device passing through the said plates farther from one end of each plate than the other, and an operative connection between the short evener and the draft levers, substantially as described.

In testimony whereof I affix my signature in presence of two witnesses.

JOHN J. WHITE.

Witnesses:
   Jno. G. Powell,
   Elizabeth Bowen.